June 10, 1930.  E. D. MEAD  1,762,731
MAGNETIC DEVICE
Filed Aug. 15, 1929  3 Sheets-Sheet 1

INVENTOR
E. D. MEAD
BY
M. P. McKenney
ATTORNEY

June 10, 1930.  E. D. MEAD  1,762,731
MAGNETIC DEVICE
Filed Aug. 15, 1929  3 Sheets-Sheet 2

INVENTOR
E. D. MEAD
BY
M. P. McKenney
ATTORNEY

June 10, 1930.  E. D. MEAD  1,762,731
MAGNETIC DEVICE
Filed Aug. 15, 1929  3 Sheets-Sheet 3
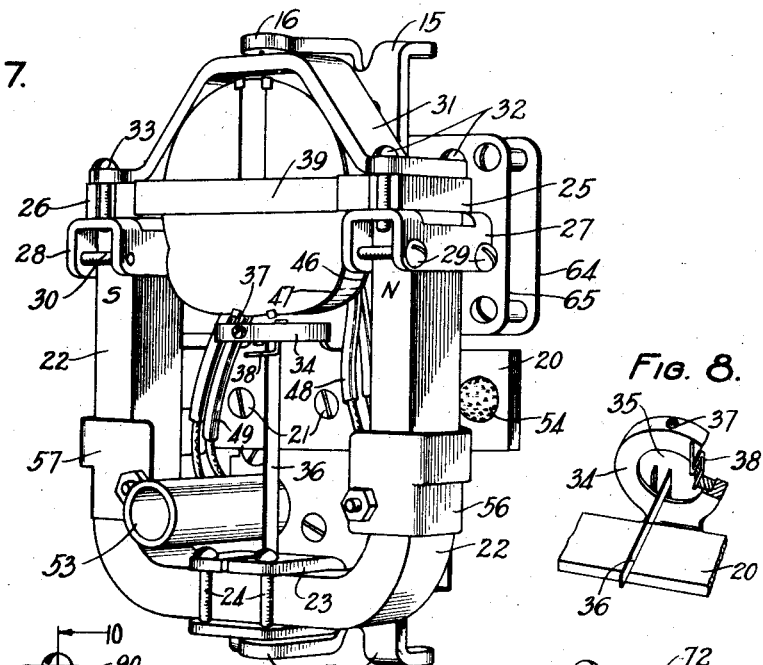
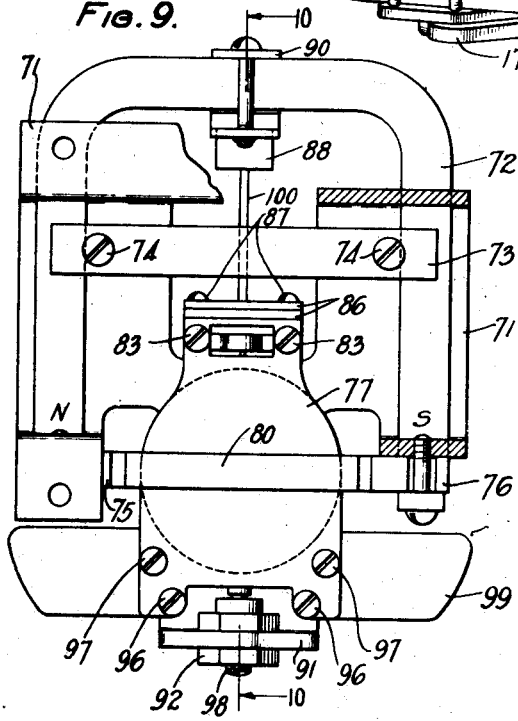
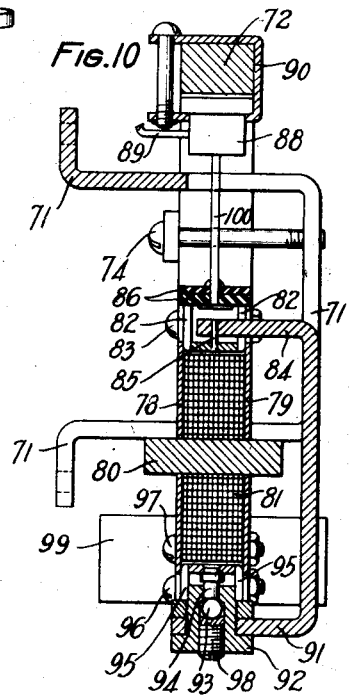
INVENTOR
E. D. MEAD
BY
ATTORNEY Patented June 10, 1930

1,762,731

UNITED STATES PATENT OFFICE

EDWARD D. MEAD, OF CALDWELL, NEW JERSEY, ASSIGNOR TO BELL TELEPHONE LABORATORIES, INCORPORATED, OF NEW YORK, N. Y., A CORPORATION OF NEW YORK

MAGNETIC DEVICE

Application filed August 15, 1929. Serial No. 386,207.

This invention relates to magnetic devices and particularly to electromagnetically operated devices for measuring telephone service.

The object of the invention is to secure an improved measuring instrument which is efficient and dependable in operation and also one which is rugged and compact in construction.

Heretofore, various types of telephone substation meters have been proposed for measuring the amount of use the subscriber makes of his telephone. Many of these are open to the objection that they are not efficient enough to operate on the low operating currents available. Others are not dependable in that they respond to ringing currents and to transient currents that may appear in the line. Others are delicate in construction and subject to damage in handling and shipping.

According to the present invention, these objections are overcome by means of an instrument comprising a ponderous U-shaped permanent magnet suspended on a metallic reed, thus obviating bearings and pivots which offer considerable friction and which are also easily damaged. The pole-pieces of the permanent magnet cooperate magnetically with the poles of a stationary H-shaped electromagnet. Due to the shape of the electromagnet, a large winding space is afforded for the coils, a constant air-gap is provided for all positions of the instrument, thus avoiding undue bias, and a very efficient magnetic circuit is had since a substantially complete reversal of flux is secured through the core of the windings as the permanent magnet oscillates.

A feature of the invention is a device in which the magnetic circuit is so designed that the polarizing flux tends to hold the rotor in its extreme positions, when once placed in either of these positions; this biasing force is almost exclusively effective only in the end positions and there is practically no tendency to move the rotor from intermediate positions to either of these extreme positions. The actuating elements are so disposed in the case that a relatively small current, through the winding of the electromagnet, will be sufficient to overcome this end bias.

The drawing comprising Figures 1 to 10 inclusive shows a telephone metering device in which this invention is embodied.

Fig. 7 is a rear view of the actuating elements and Fig. 8 is a detail drawing of the upper support for the metallic reed on which the permanent magnet is suspended.

Figures 9 and 10 show an alternative arrangement of the actuating elements of a metering device which is, in other respects, similar to that shown in Figures 1 to 8 inclusive.

Figure 1:
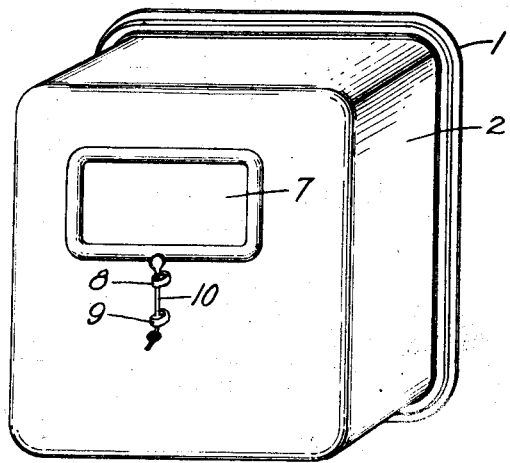
Fig. 1 is a front view of the meter as it appears when installed for service.

The meter shown in the drawing consists of a non-magnetic metallic framework of two members 15 and 20 (see Fig. 7), an electromagnet whose core 39 is rigidly supported by the member 15, a permanent magnet 22 which is suspended by the reed 36 from a horizontally projecting arm of member 20 and which is pivoted at the upper and lower extremities 16 and 17 of the member 15 to permit a limited angular movement, a gear train 66 and indicating mechanism (not shown in Fig. 4) fastened to member 15 and arranged for actuation by the movement of the permanent magnet, a base 1 and casing 5, an inside cover 11, and an outside cover 2. (See Figs. 1, 2, 3 and 4.)

Figure 4:
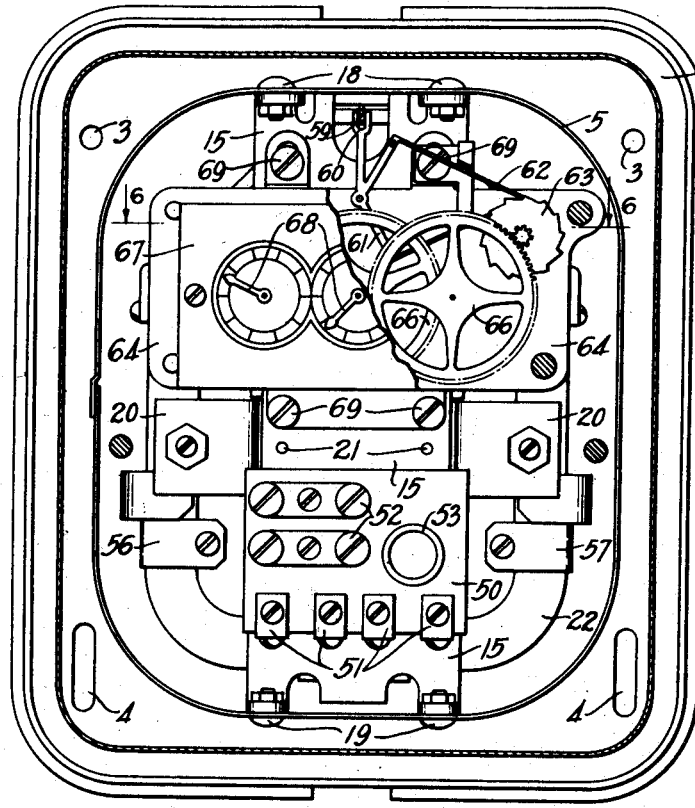
Fig. 4 is a front view of the device with both the outer and inner covers removed.

The framework, by which the electromagnet, permanent magnet, and indicating mechanism are supported fits into the metal casing 5 (as shown in Fig. 4) and is fastened thereto by screws 18 and 19. The casing 5 is affixed to and extends out from the metal base 1, and the inside cover 11 which fits over the front of casing 5 is fastened to base 1 by studs 14 and the nuts which are turned onto the threaded ends of these studs. The end of one of these studs projects beyond the nut and a hole is drilled in the projecting portion so that the assembled meter exclusive of the outside cover may be sealed at the factory. The base, casing and inside cover constitute a magnetic shield for the actuating elements of the meter. The base 1 is arranged to be fastened to a wall or other vertical support, the screw holes 3 and 4 being provided therefor. The outside cover 2 fits over the casing 5 onto base 1 being fastened by screw 8 to the inner cover 11. The base is formed so that either a glass or a metal outside cover may be used. A seal 10 passes through the head of screw 8 and the lug 9, which is affixed to the cover, so as to prevent tampering with the mechanism after installation. The opening 12 in cover 11 and the glass 7 inserted in a corresponding opening in cover 2 make the dial plate 67 and indicators 68 visible from the front of the meter. The opening 6 in base 1 is used as an entrance for the wires leading in from the circuit which controls the operation of the meter; the lead-in wires (not shown) are extended through the insulating tube 53 to lugs 51 on terminal block 50 (see Fig. 4). In the case of a telephone meter installed at a subscriber's station, the line conductors from the central office are connected to the outer pair of lugs and the conductors from the telephone instrument are connected to the inner pair of lugs. These lugs are connected by conductors 48 and 49 (shown in Fig. 7) to the windings 44 and 45 of the electromagnet in such a manner that one of the windings is inserted in one side of the line and the other winding is inserted in the other side of the line. Additional lugs 52 are provided for the termination and extension of other conductors associated with the subscriber's instrument. The opening 13 in cover 11 gives access to the terminal block 50 by removing the outer cover only.

The magnetic metallic core 39 of the electromagnet is fastened by screws 58 (shown in Fig. 6) to framework member 20. The core is H-shaped, the coils 44 and 45 being wound around the middle member of the core between the non-magnetic spool heads 46 and 47. The limbs 40 and 41 at one end of core 39 are adjacent to the pole piece 25 of the north pole of permanent magnet 22; and the limbs 42 and 43 at the other end of core 39 are adjacent to the pole piece 26 of the south pole of permanent magnet 22.

Figure 5:
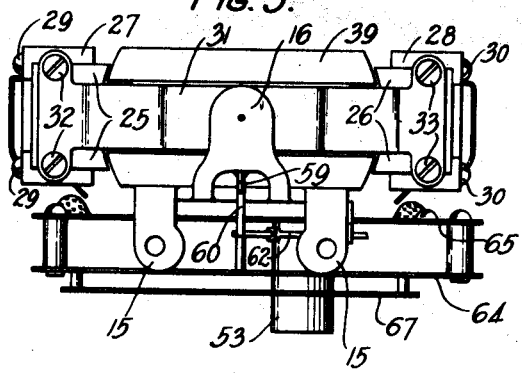
Fig. 5 is a top view of the actuating elements only.
Figure 6:
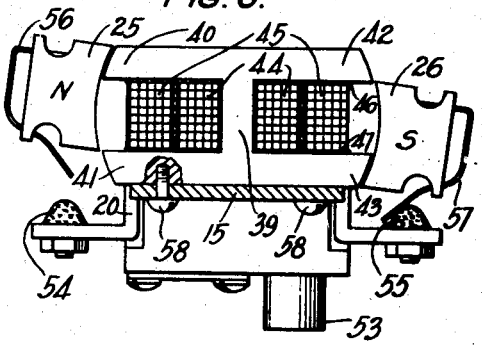
Fig. 6 is a top view of a horizontal section of the actuating elements taken at 6—6 in Fig. 4, the indicating mechanism having been removed.

A portion of the framework member 20 extends horizontally outward to form a support from which the permanent magnet 22 is suspended. (See Figs. 7 and 8). The upper end of reed 36 is fastened in a metal disc 35, the disc being seated in the projecting portion 34 of the frame. A lever 38 is set into disc 35 and projects outward for use in adjusting the angular position of the disc so as to vary the torque of reed 36. Set screw 37 is provided to fasten the disc in the desired position. The lower end of reed 36 passes through a slit in the upper side of a clamping device 23. The clamp 23 fits over the bottom of the U-shaped permanent magnet, being fastened thereto by screws 24; the lower end of reed 36 is bent at right angles so as to be held between the clamp and the magnet. The clamp 23 is pivoted by a pin extending downward into the projecting portion 17 of framework member 15. To form an upper pivot for magnet 22, a metal yoke 31 is fastened by screws 32 and 33, clamping devices 27 and 28, and by screws 29 and 30, respectively (as shown in Fig. 7) to the poles of magnet 22; and a pin extends upward from the surface of yoke 31 into the projecting portion 16 of framework member 15. This arrangement permits the magnet 22 to move back and forth about an axis passing through the center of the pins which project into the portions 16 and 17 of framework member 15, the weight of the magnet being carried by reed 36. The adjustable cork faced stops 54 and 55 (see Figs. 5 and 6) secured to framework member 20, and the spring buffers 56 and 57 fastened to the limbs of magnet 22, limit the movement of the magnet about this axis. The buffers and stops also prevent rebound when the magnet 22 reaches the end of its movement, in either direction, without tending to retain the magnet in either of its extreme positions when the electromagnet is energized for moving the magnet 22 into the other of its extreme positions. The screws 32 and 33, by which yoke 31 is fastened to clamping devices 27 and 28, also serve to secure the pole pieces 25 and 26 to the N and S poles, respectively, of magnet 22. The pole pieces and the ends of the core 39 are so shaped that the air gap, between the pole pieces and the adjacent limbs of the core, remains constant when the magnet 22 is moved from one extreme position to the other. Each pole piece embraces an arc of such length that in either of the extreme positions of magnet 22 only one of the limbs at each end of core 39 is covered by the corresponding pole piece. For instance, with the magnet 22 in one extreme position as shown in Fig. 6, pole piece 25 covers the end of limb 40 without covering the end of limb 41; while pole piece 26 covers the end of limb 43 without covering the end of limb 42.

The mechanism for driving the indicator train (see Figs. 4 and 5) includes a pin 59 which extends horizontally forward from the side of yoke 31 to engage the forked end of driving lever 60. Two driving pawls 61 and 62 are pivoted on extensions of lever 60 so as to engage ratchet wheel 63. The movement of the magnet 22 from one extreme position to the other is thus effective to advance the ratchet wheel 63. The advance of wheel 63 is in turn transmitted through its spindle to the first gear in the train 66. The ratchet wheel 63 and gears 66 are mounted between plates 64 and 65, the gear spindles extending frontward through the dial plate 67 which is attached to the front of plate 64. The hands attached to the end of the gear spindles indicate on their respective dials the number of reversals of current through the windings of the electromagnet by which the permanent magnet has been moved from one position to the other. In the case of a telephone meter the hands indicate the number of conversation units for which the subscriber, at whose station the meter is installed, is to be charged. The indicating mechanism is fastened to framework member 20 by screws 69.

With the permanent magnet 22 in its mid-position and with no current through the windings of the electromagnet there is no force tending to rotate magnet 22, but when the magnet 22 is in either of its extreme positions there is a force tending to hold it in this position; this end biasing force renders the reed 36 ineffective to return magnet 22 to its mid-position when the actuating current through the windings of the electromagnet ceases. The position of the magnetic elements (with respect to the base, casing and inside cover) and the amplitude of the angular movement of the permanent magnet, as controlled by stops 54 and 55, are such that the operating current, which is required to overcome this biasing force, is no larger than necessary. When the magnet 22 is in the position shown in Fig. 6, the circuit for the major portion of the poralizing flux, which produces the biasing force, may be traced from the N pole of magnet 22, through pole piece 25, through the air gap to limb 40 of core 39, through the middle of core 39, through limb 43, across the air gap and through pole piece 26, to the S pole of magnet 22, and through the magnet back to the N pole; if the magnet 22 is in the other of its extreme positions the circuit for the polarizing flux includes the limbs 41 and 42 of core 39 instead of limbs 40 and 43.

When the windings 44 and 45 are energized by a current of sufficient magnitude and duration in one direction the fields of the permanent and electromagnets react to move magnet 22 to one of its extreme positions; and when the current is in the opposite direction magnet 22 is moved to the other of its extreme positions. In the case of a telephone meter, successive reversals of current over the line (every 15 seconds, or other desired interval) rotate the magnet back and forth, from one end position to the other, during the time that the calling and called subscribers' stations are connected for talking.

In the alternative arrangement, shown in Figs. 9 and 10, the permanent magnet is rigidly fastened to the framework and the electromagnet is movable to actuate the indicating mechanism. Fig. 9 is a front view and Fig. 10 shows a vertical section at 10—10 as indicated in Fig. 9.

The limbs of the permanent magnet 72 extend through holes in the framework member 71 and are clamped thereto in the desired position by the bar 73 and screws 74. The projecting portions 84 and 91 (see Fig. 10) form the bearings on which the electromagnet can rotate back and forth within its extreme positions. The projection 84 extends into the detail 82 which is fastened by screws 83 to the extending portions of spool heads 78 and 79; and the pin 85 projects upward from the bottom of detail 82 into the projection 84 so as to pivot the electromagnet at that point. The lower bearing is a ball thrust bearing whose seat 92 is screwed into the projection 91; the position of ball 93 may be adjusted therein by turning screw 98. The pin 94 whose lower surface rests on the ball 93 extends downward from detail 95 which is fastened by screws 96 to the spool heads 78 and 79; thus the weight of the movable member is carried by the ball bearing so that friction is reduced to a minimum. The metal bar 99 which is held by screws 96 and 97 between the lower portions of spool heads 78 and 79 adds mass to the movable member so as to render the meter less susceptible to momentary impulses of current and to mechanical vibration. The lead-in wires 100 are carried through the tube 89 into detail 88, which is fastened by the clamping device 90 to the middle portion of the permanent magnet, and then downward along the axis of rotation through insulating strips 86 (which are fastened to detail 82 by screws 87) to the windings 81 of the electromagnet. This arrangement eliminates any torsional resistance, in the lead-in wires, to the movement of the electromagnet.

The coil 81 of the electromagnet is wound around the middle member of the H-shaped core 80 between the spool heads 78 and 79. The core 80 extends between pole pieces 75 and 76 which are screwed, respectively, to the N and S poles of magnet 72. The pole pieces and core are shaped to maintain a uniform air gap; and the pole pieces are of such a length that each covers only one of the core ends when the electromagnet is in either of its extreme positions, the circuits for the polarizing flux being similar to those hereinbefore described for the preferred embodiment of this invention.

Figure 2:
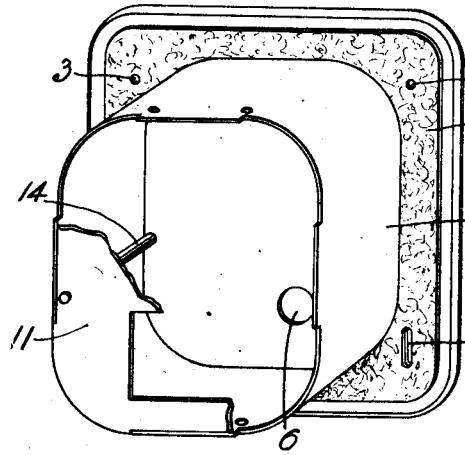
Fig. 2 shows the base plate and inner casing, the outside cover having been removed.
Figure 3:
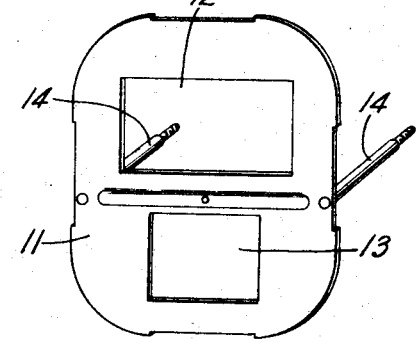
Fig. 3 shows the inner cover, which is partially cut away in Fig. 2.

The indicating mechanism, base, and covers for the alternative arrangement are not shown but may be similar to those disclosed in Figs. 1, 2 and 3.

The scope of the invention, which is not limited to the specific embodiments herein disclosed, is indicated by the claims.

What is claimed is:

1. In combination, a U-shaped permanent magnet suspended to oscillate freely from one position to another, a stationary electromagnet located between the pole-pieces of said permanent magnet having opposite pole-pieces presented respectively to the opposite pole-pieces of said permanent magnet such that the air gaps between the electromagnet and said permanent magnet are constant for different positions of the permanent magnet, an energizing coil for said electromagnet, and means actuated in response to the oscillation of said permanent magnet.

2. In combination, a U-shaped permanent magnet suspended to oscillate freely from one position to another, an H-shaped electromagnet located between the pole-pieces of said permanent magnet having its opposite pole-pieces presented respectively to the opposite pole-pieces of said permanent magnet such that the air gaps between the electromagnet and the permanent magnet are uniform for all positions of the permanent magnet, an energizing coil wound on said H-shaped magnet, and means actuated in response to the oscillation of said permanent magnet.

3. In combination, a permanent magnet suspended on a reed for oscillation from one position to another, a stationary electromagnet located between the pole-pieces of said permanent magnet and having opposite pole-pieces presented respectively to the opposite pole-pieces of said permanent magnet, an energizing coil for said electromagnet, and a driven element actuated in response to the oscillation of said permanent magnet.

4. In combination, a U-shaped permanent magnet, an electromagnet having an H-shaped core, a framework supporting both of said magnets in such a manner that one end of each pole of said electromagnet is adjacent to the N pole of said permanent magnet and the other end of each pole of said electromagnet is adjacent to the S pole of said permanent magnet, one of said magnets being supported by said framework in such a manner that it can rotate from one extreme position to another, and means actuated by the movement of said suspended magnet.

5. In combination, a U-shaped permanent magnet, an electromagnet having an H-shaped core located between the pole pieces of said permanent magnet so that one end of each pole of said electromagnet is adjacent to the N pole of said permanent magnet and the other end of each pole of said electromagnet is adjacent to the S pole of said electromagnet, and a framework supporting both of said magnets in such a manner that one of said magnets can be rotated from one extreme position to another without varying the air gap between the core of said electromagnet and the pole pieces of said permanent magnet.

6. In combination, a U-shaped permanent magnet, an electromagnet having an H-shaped core located between the pole pieces of said permanent magnet so that one end of each pole of said electromagnet is adjacent to the N pole of said permanent magnet and the other end of each pole of said electromagnet is adjacent to the S pole of said electromagnet, a framework supporting both of said magnets in such a manner that one of them is free to rotate from one position to another without varying the air gap between the adjacent portions of said core and said pole pieces, the energization of the coil of said electromagnet by current in one direction being effective to rotate said one of said magnets to one of its extreme positions, the energization of the coil of said electromagnet by current in the opposite direction being effective to rotate said one of said magnets to the other of its extreme positions, and means actuated by the movement of said one of said magnets.

7. A magnetic device comprising a permanent magnet, an electromagnet having a core extending between the poles of said permanent magnet so that one end of each pole of said electromagnet is adjacent to the N pole of said permanent magnet and the other end of each pole of said electromagnet is adjacent to the S pole of said permanent magnet, a framework for rigidly supporting one of said magnets and for suspending the other of said magnets so that the suspended magnet can rotate from one extreme position to another, and means actuated by the movement of said suspended magnet.

8. In a magnetic device, an electromagnet having an H-shaped core, a permanent magnet, a frame supporting said magnets so that one of said magnets is free to rotate from one position to another, and a circuit for the flux of said permanent magnet which includes one leg of each pole of said electromagnet for holding said rotatable magnet in one of its extreme positions without appreciably tending to cause said rotatable magnet to rotate from an intermediate position to said extreme position.

9. In a magnetic device, a permanent magnet, an electromagnet having an H-shaped core, one of said magnets being free to rotate from one extreme position to another, a circuit for the flux of said permanent magnet which includes one leg of each pole of said electromagnet for holding said rotatable magnet in one of its extreme positions without appreciably tending to cause said rotatable magnet to move from an intermediate position to said extreme position, and means actuated by the movement of said rotatable magnet.

10. In a magnetic device, a U-shaped permanent magnet suspended to rotate freely from one position to another, a stationary electromagnet having an H shaped core, a coil for said electromagnet wound around the middle member of said core, a circuit for the flux of said permanent magnet which includes one leg of each pole of said electromagnet for holding said permanent magnet in one of its extreme positions without appreciably tending to cause said permanent magnet to move from an intermediate position to said extreme position, and means actuated by the movement of said permanent magnet.

11. In combination, two magnets one of which is a permanent magnet and the other an electromagnet, pole pieces for said permanent magnet, an H-shaped core for said electromagnet, a frame rigidly supporting one of said magnets, means including said frame for supporting the other of said magnets in such a manner that it can rotate back and forth between two limiting positions, a coil for said electromagnet wound around the middle member of said core so that its energization by current in one direction causes the rotation of said rotatable magnet to one of its limiting positions and its energization by current in the other direction causes the rotation of said rotatable magnet to the other of its limiting positions, and means actuated by the movement of said rotatable magnet.

12. A magnetic device comprising a U-shaped permanent magnet, pole pieces for said permanent magnet, an electromagnet having an H-shaped core located between said pole pieces, a frame for rigidly supporting said electromagnet, means for suspending said permanent magnet from said frame so that said permanent magnet can rotate on a vertical axis without varying the air gap between said core and said pole pieces, means for limiting the rotation of said permanent magnet between two positions in each of which one of said pole pieces overlaps the corresponding end of one pole of said electromagnet and said coil without overlapping the corresponding end of the other pole of said electromagnet and the other of said pole pieces overlaps the corresponding end of said other pole of said electromagnet and said coil without overlapping the corresponding end of said one pole of said electromagnet, and means actuated by the movement of said permanent magnet.

13. In combination, a U-shaped permanent magnet, an electromagnet having an H-shaped core located between the poles of said permanent magnet, a frame rigidly supporting said electromagnet, means including said frame and a metallic reed for suspending and pivoting said permanent magnet in such a manner that it can rotate, stop pins for limiting the rotation of said permanent magnet in either direction, means for preventing rebound of said permanent magnet when it reaches either of its limiting positions, a coil for said electromagnet wound around the middle member of said core so that its energization by current in one direction causes said permanent magnet to rotate to one of its limiting positions and its energization by current in the other direction causes said permanent magnet to rotate to the other of its limiting positions, pole pieces for said permanent magnet so proportioned that in either of the limiting positions of said permanent magnet one of said pole pieces overlaps the adjacent end of one pole of said electromagnet and said coil without overlapping the adjacent end of the other pole of said electromagnet, and means actuated by the movement of said permanent magnet.

In witness whereof, I hereunto subscribe my name this 9th day of August, 1929.

EDWARD D. MEAD.